United States Patent
Babkin et al.

(10) Patent No.: US 8,087,256 B2
(45) Date of Patent: Jan. 3, 2012

(54) COOLING METHODS AND SYSTEMS USING SUPERCRITICAL FLUIDS

(75) Inventors: Alexei V. Babkin, Albuquerque, NM (US); Robert V. Duncan, Tijeras, NM (US); Anatoly I. Efremov, Albuquerque, NM (US); Peter J. Littrup, Bloomfield Hills, MI (US)

(73) Assignee: Cryomechanics, LLC, Albuquerque, NM (US)

(*) Notice: Subject to any disclaimer, the term of this patent is extended or adjusted under 35 U.S.C. 154(b) by 681 days.

(21) Appl. No.: 12/284,448

(22) Filed: Sep. 23, 2008

(65) Prior Publication Data
US 2009/0113903 A1    May 7, 2009

Related U.S. Application Data

(60) Provisional application No. 60/985,091, filed on Nov. 2, 2007.

(51) Int. Cl.
*C09K 5/04*    (2006.01)
(52) U.S. Cl. .......................... 62/114; 62/434
(58) Field of Classification Search ........... 62/114, 62/DIG. 2, 259.2, 434, 498, 513, 515; 165/80.4, 165/104.33; 361/699, 701
See application file for complete search history.

(56) References Cited

U.S. PATENT DOCUMENTS

| | | | |
|---|---|---|---|
| 4,205,532 A | 6/1980 | Brenan | |
| 5,245,836 A | 9/1993 | Lorentzen et al. | |
| 5,405,533 A | 4/1995 | Hazlebeck et al. | |
| 6,024,542 A | 2/2000 | Philips et al. | |
| 6,105,380 A | 8/2000 | Yokomachi et al. | |
| 6,105,386 A * | 8/2000 | Kuroda et al. | 62/513 |
| 6,179,568 B1 | 1/2001 | Philips et al. | |
| 6,260,367 B1 * | 7/2001 | Furuya et al. | 62/197 |
| 6,343,486 B1 | 2/2002 | Mizukami | |
| 6,591,618 B1 | 7/2003 | Howard et al. | |
| 6,658,888 B2 | 12/2003 | Manohar et al. | |
| 6,698,214 B2 | 3/2004 | Chordia | |
| 6,848,268 B1 | 2/2005 | Memory et al. | |
| 6,871,511 B2 * | 3/2005 | Okaza et al. | 62/498 |
| 6,967,840 B2 | 11/2005 | Chrysler et al. | |
| 7,035,104 B2 | 4/2006 | Meyer | |
| 7,123,479 B2 * | 10/2006 | Chang et al. | 361/700 |
| 7,140,197 B2 * | 11/2006 | Chordia et al. | 62/401 |
| 2003/0062619 A1 | 4/2003 | Ritz et al. | |
| 2003/0102113 A1 | 6/2003 | Memory et al. | |
| 2006/0059945 A1 | 3/2006 | Chordia et al. | |
| 2006/0086110 A1 | 4/2006 | Manole | |
| 2006/0123827 A1 | 6/2006 | Achaichia | |
| 2007/0000281 A1 | 1/2007 | Manole | |

FOREIGN PATENT DOCUMENTS
WO    WO 2007/022 778    3/2007
* cited by examiner

*Primary Examiner* — Mohammad Ali

(57) ABSTRACT

The methods and systems using supercritical fluids for cooling of objects with high thermal emissions are disclosed. The unique thermodynamic properties of supercritical fluids combined with microchannel cooling technology allow effective absorption of the waste heat and exclude "vapor lock", "boiling crisis", and other deficiencies of conventional two-phase liquid cooling.

4 Claims, 5 Drawing Sheets

COOLING METHODS AND SYSTEMS USING SUPERCRITICAL FLUIDS

CROSS REFERENCE TO RELATED APPLICATIONS

This Patent Application is the continuation of an earlier application of, and claims the benefit of the filing date of, U.S. Provisional Patent Application Ser. No. 60/985,091 entitled "Cooling Method and Systems Using Supercritical Fluids" filed on Nov. 2, 2007.

FEDERALLY SPONSORED RESEARCH

Not Applicable

SEQUENCE LISTING OR PROGRAM

Not Applicable

BACKGROUND OF THE INVENTION

1. Field of the Invention

The present invention relates to cooling methods and systems that employ refrigerants in their supercritical state combined with microchannel cooling technology in closed or open cooling cycles.

2. Prior Art

Reliable and effective cooling methods and systems are one of the basic problems in development of future electronic equipment, jet and internal-combustion engines, spacecraft systems and structures, fuel cell technologies, infrared radiation detectors, nuclear power generation, and others.

Cooling electronic systems is the one of the most acute problems. Modern electronic devices operate at higher power densities and higher temperatures than before and create more waste heat. Current and future electronic devices can produce heat fluxes of more than 1,000 W/cm$^2$. These heat fluxes will raise device temperatures and lead to reduced efficiency and lower durability. The rapidly growing computer industry is continuously in search of new ways to cool microprocessors. Innovative chip architectures create localized hot spots which require the development of on-demand, locally addressable cooling methods and solutions.

The abundance of worldwide patent documents for cooling methods and device applications highlights the importance of the cooling problem. It also suggests that approaches and solutions previously proposed for a variety of cooling methods and sophisticated cooling systems could not entirely guarantee the reliable and extended service life of critical components having high temperature thermal emissions.

It is well known that in order to reliable handle large thermal loads that contribute to thermal resistance, it is essential to maximize and/or optimize the heat exchange surface contact area between the cooling agent (refrigerant) and the cooling head itself. If the heat exchange area is not adequate for the heat load, the critical electronic device becomes thermally "decoupled" from the refrigerant and may be significantly overheated. A substantial increase in heat exchange area can be achieved by streaming a refrigerant through a network of microchannels. Thermally conductive materials structured with microchannels less than 50 μm in diameter are known to have a surface area of about (1 . . . 10) m$^2$/g, or even more with a high thermal capacity for removing a large quantity of heat. Microchannel cooling thus has distinct advantages over any other cooling method.

Currently the most efficient cooling method using microchannel technology is based on the two-phase flow regime of liquid refrigerants that are in thermal contact with the objects to be cooled. Conventionally, the microchannel cooling is achieved inside a microchannel heat sink thermally connected with the surface containing the electronic device. This microchannel heat sink is manufactured from a solid substrate having a high thermal conductivity. It contains the microchannels of varied complex configurations that serve as flow passages for the liquid refrigerants and that increase the surface contact area between the liquid refrigerant and the electronic device. The heat generated by the electronic device is transferred to the microchannel heat sink and removed from the heat sink by the evaporation of the liquid refrigerant flowing through the microchannels.

Two-phase liquid cooling using the latent heat of evaporation of the liquid refrigerant is capable of absorbing a large amount of the waste heat, but the biggest downside of a two-phase liquid cooling system is the potential for rapid failure due to a condition known as "vapor lock". For example, as the electronic device with high heat emission begins to heat, the liquid refrigerant in thermal contact with the electronic device begins to boil and converts to vapor. Evaporation causes an enormous expansion of volume (i.e., 1:1,000, or even more) resulting in exceptionally poor gas flow cooling compared to that achieved within the liquid phase. The small volume of a microchannel cooling system excludes an efficient application of two-phase liquid cooling since the liquid refrigerants cannot continue to flow against the massive volume of the gas ahead of itself.

All prior attempts at two-phase liquid flow cooling accompanied by evaporation required sophisticated designs to avoid "vapor lock". However, the efficiency of the heat transfer inevitably will be limited by the existence of Critical Heat Flux (CHF) above which the two-phase cooling system suffers a "boiling crisis". The "boiling crisis" appears when the vapor bubbles on the heated surface abruptly form a thin film that thermally insulates the now dry hot surface from the cooling liquid. In this case heat transfer to the fluid will be blocked and the temperature of the object to be cooled will increase rapidly leading to the complete destruction of the electronic device. Engineering solutions to avoid the "boiling crisis" practically exclude the application of two-phase liquid cooling in future electronic device architectures.

The new cooling methods and systems claimed by the present invention relate to the application of refrigerants maintained at their supercritical fluid state to prevent the "vapor lock" and "boiling crisis". The patent materials below are the closest to the present invention.

U.S. Pat. No. 4,205,532 by Brenan discloses a heat pump that comprises a closed circuit containing an acceptor (evaporator) for heat absorption by a refrigerant, a compressor for compressing the heated refrigerant issued from acceptor, a rejector (condenser) for heat rejection by the compressed refrigerant, and an expansion device to expand the refrigerant from the rejector before it is directed back to the acceptor. The acceptor and rejecter are the counter-current heat exchangers, and the compressor compresses the refrigerant leaving the acceptor to reach its supercritical pressure while simultaneously raising its temperature. The compressed refrigerant is directed into the heat rejector that decreases its temperature without pressure change, and the expansion device expands the refrigerant leaving the rejector thereby reducing further its temperature and simultaneously its pressure.

The heat pump embodiment of this invention is constructed along the same lines as a conventional heat pump where refrigerant being compressed to reach its supercritical pressure is directed into the heat rejecter (condenser). The expansion device must provide a sufficient degree of throttling to reduce refrigerant pressure to a suitable subcritical value before it enters the acceptor (evaporator) to absorb heat. The disclosed heat pump can be employed to heat a fluid to a temperature in excess of the critical temperature of a refrigerant. Since the refrigerant in the rejector (condenser) is under supercritical pressure corresponding to a single-phase fluid, there is no requirement for liquid drainage through the rejector.

The same vapor compression cycle is used in refrigeration, air-conditioning and heat pump systems operating under supercritical conditions that are disclosed in U.S. Pat. No. 5,245,836 by Lorentzen et al., U.S. Pat. No. 5,405,533 by Hazlebeck et al., U.S. Pat. No. 6,105,380 by Yokomachi et al., U.S. Pat. No. 6,343,486 by Mizukami, U.S. Pat. No. 6,591,618 by Howard et al., U.S. Pat. No. 6,658,888 by Manohar et al., U.S. Pat. No. 6,698,214 by Chordia, U.S. Pat. No. 6,848,268 by Memory et al., and in U.S. Pat. Applications Nos. 2003/0102113 by Memory et al., 2006/0059945 by Chordia et al., 2006/0086110 and 2007/0000281 both by Manole, 2006/0123827 by Achaichia, and WO 2007022778 by Christensen.

The conventional vapor compression process producing supercritical fluids which further reject heat absorbed by the evaporation of a liquid refrigerant under subcritical conditions is the basis of the most prior patent documents. This significantly limits the difference between the enthalpy at the entrance of the rejector and the enthalpy at the exit of the rejector due to the limited temperature interval of the supercritical fluids to be used. This shortcoming is common for all cited prior patent documents based on the application of supercritical fluids. Moreover, the use of supercritical fluids to reject heat significantly reduces the efficiency in the cooling cycle because the heat absorption is provided by a conventional two-phase evaporative liquid. The two-phase evaporative liquid will unavoidable limit the effectiveness of microchannel cooling because the unique thermodynamic properties of the supercritical fluids will be ignored and the problem of "vapor lock" will remain unresolved.

The attempts to overcome "vapor lock" are disclosed in U.S. Pat. No. 6,024,542 and U.S. Pat. No. 6,179,568 both by Phillips et al., U.S. Pat. No. 6,967,840 by Chrysler et al., U.S. Pat. No. 7,035,104 by Meyer as well as in U.S. Pat. Application No. 2003/0062619 by Ritz et al.

The '542 and '568 patents describe sophisticated piston pumps and the method of reducing "vapor lock" by mixing the vapor and liquid portions of a refrigerant and introducing the mixture into the piston pump. The '840 patent discloses the clearing of "vapor lock" in a microchannel cooling subsystem. A pumping mechanism and auxiliary flow generator, both coupled to an input of the microchannel cooling subsystem, provide two different pressure levels to create turbulence in the fluid flow that contributes to the clearing of "vapor lock" inside the microchannels. The '104 patent describes a mini/microchannel multi-level-cooling enhancement stud of the cooling system that is thermally connected with a heat dissipating device mounted to the liquid coolant module containing subcooled liquid coolant. Heat removal from such a device is accompanied by routine intensive boiling of the liquid coolant, and vapor bubbles nucleate, grow, and depart at high frequency, constantly being replaced by incoming jet-impinged subcooled liquid coolant.

All of the proposed cooling systems may delay "vapor lock" in some instances, but they cannot completely resolve this problem because of unavoidable technical and thermodynamic difficulties that practically limit the application of all two-phase cooling technologies.

The '619 patent discloses a heat transfer system to maintain the fluid in its supracritical state without any changes in phase of the fluid thus avoiding "vapor lock". A thermoelectric cooler is used to remove heat from the supracritical fluid that is in thermal contact with a heat-generating surface for a sufficiently short dwell time. A single-phase supracritical carbon dioxide operating at critical pressure and temperature interval between 25° C. and 40° C. has the same disadvantages described above due to a limited difference between the enthalpy in the start and end points of the cooling process.

Accordingly, it is a principal object of the present invention to form novel cooling methods and systems using supercritical fluids that are capable of absorbing a large quantity of the heat within microchannel cooling devices using closed or open cooling cycles and avoiding "vapor lock" inside the microchannels.

SUMMARY OF THE INVENTION

Considering the cooling problem from the application point of view for supercritical fluids, and recognizing all the deficiencies of the prior art, it is the primary objective of the present invention to form novel methods and systems using supercritical fluids that provide maximum efficiency and the reliable absorption of heat within the microchannels that are in direct thermal contact with the objects to be cooled.

Another objective of the invention is to provide rapid and reliable heat absorption and dissipation using nearcritical and supercritical states of refrigerants.

The next objective of the invention is to employ specific thermodynamic properties of the refrigerants in their supercritical state that is intermediate between liquid and gas. In the vicinity of the critical point of pressure and temperature, the dynamic viscosity of the supercritical fluid is near that of the normal gaseous state and much less than that of a liquid. However, the density is close to that of a normal liquid. Moreover, the thermal capacity of the supercritical fluid is even greater than that of its liquid phase. The combination of gas-like viscosity, liquid-like density and very large thermal capacity provides the most efficient and unique solutions to many cooling problems.

Still another objective of the present invention is to provide progressive cooling of heat sources using novel cooling cycles based on the supercritical state of the fluids. The thermodynamic properties of supercritical fluids allow effective absorption of a large quantity of waste heat using the unique thermal capacity and diffusivity of supercritical fluids in combination with microchannel cooling technology. The new cooling methods and systems make "vapor lock" physically impossible. A "boiling crisis" is always avoided while all the advantages of two-phase liquid cooling are maintained.

A further brief description of the applied drawings and a detailed description of the invention explain the principal concepts of the present cooling methods and systems.

DETAILED DESCRIPTION OF THE INVENTION

Figure 1:
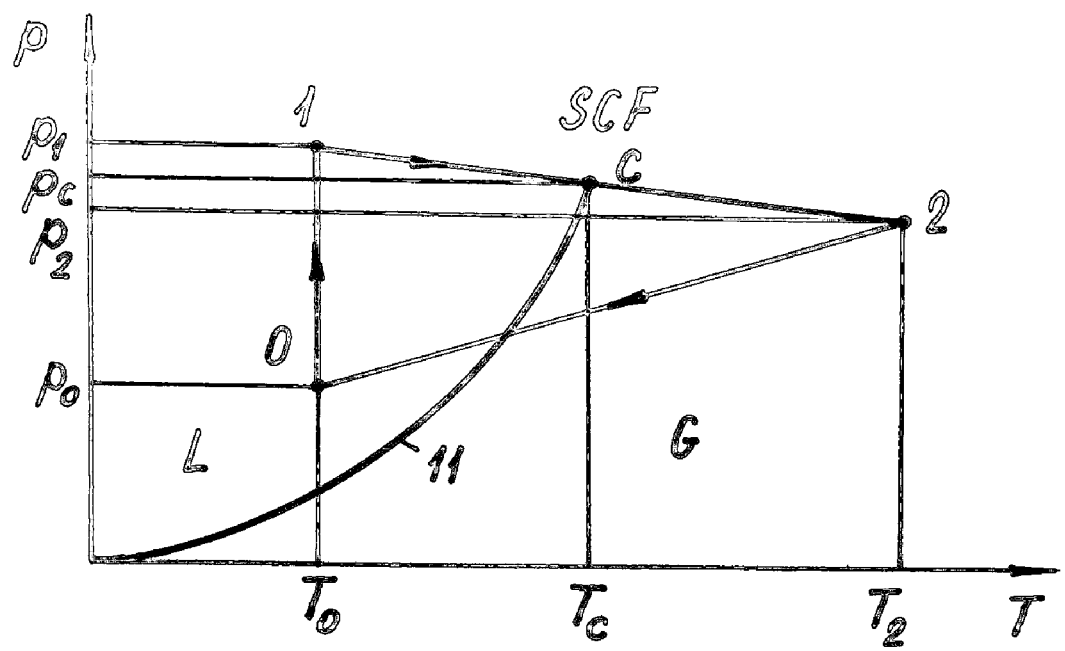
FIG. 1 shows a phase diagram LIQUID (L)-GAS (G)-SUPERCRITICAL FLUID (SCF) illustrating the basic closed cooling cycle of absorption and dissipation of the waste heat corresponding to present cooling methods.

The basic closed cooling cycle corresponding to present cooling methods is illustrated by a phase diagram LIQUID (L)-GAS (G)-SUPERCRITICAL FLUID (SCF) of the refrigerant shown in FIG. 1. The axes of the diagram correspond to pressure p and temperature T, and include a phase line 11 that defines all (p, T) points where L-G-SCF systems coexist. For (p, T) values to the left side of phase line 11, the refrigerant is in a liquid state achieved with lower temperatures and pressures while (p, T) values to the right side of phase line 11 define an area where the refrigerant is in a gaseous state achieved with higher temperatures though the pressures may be equal. The phase line 11 ends in a single particular point C that is the critical point corresponding to critical pressure $p_c$ and critical temperature $T_c$. The narrow area defined by the points $p_1$ and $p_2$ that are above and below the 5-10% critical point C is the area of near-critical fluid to satisfy the conditions as employed in this invention.

The liquid refrigerant at point 0 has initial pressure $p_0$ and initial temperature $T_0$ that are below the critical point C. The liquid refrigerant is then compressed to reach the pressure $p_1$ above its critical pressure $p_c$ at constant initial temperature $T_0$ that corresponds to its transition to a near-critical state from point 0 to point 1. The compressed refrigerant then enters into thermal contact with the hot microchannel "sponge" thermally connected with the object to be cooled that is accompanied by active heat absorption and resultant temperature increase of the refrigerant from $T_0$ to $T_2$ and the corresponding rapid refrigerant transition through the critical point C and further to point 2 when it passes the critical temperature $T_c$. The temperature $T_2$ corresponds to the maximum allowable operational temperature of the object to be cooled. Point 2 defines the near-critical state of the refrigerant due to the pressure drop from $p_1$ to $p_2$ caused by the hydraulic resistance (impedance) of the microchannel "sponge" inside the cooling head.

The refrigerant then begins to dissipate removed waste heat into the environment from a conventional heat exchanger combined with an expansion device. This results in a decrease of the temperature and pressure to their initial values $T_0$ and $p_0$. This temperature and pressure decrease transfers the refrigerant to its initial liquid state corresponding to the 2-0 path, and this closed cooling cycle is continuously repeated.

Several types of refrigerants may be used to provide effective waste heat absorption and dissipation based on the proposed method. These refrigerants must have zero Ozone Depleting Potential and low Global Warming Potential to satisfy all requirements of the Montreal Protocol and other regulatory documents. As an example, two of the basic candidates are readily available and relatively inexpensive: carbon dioxide ($CO_2$) and nitrogen ($N_2$). Additionally, a commonly used refrigerant such as R-508 can be used as a cooling compound as well. Standard R-508 refrigerant exists in two types, namely R-508A that is a blend of R-23 (39%) and R-116 (61%) refrigerants, and R-508B that is a blend of R-23 (46%) and R-116 (54%) refrigerants. Some properties of these refrigerants are presented in the following TABLE.

Figure 2:
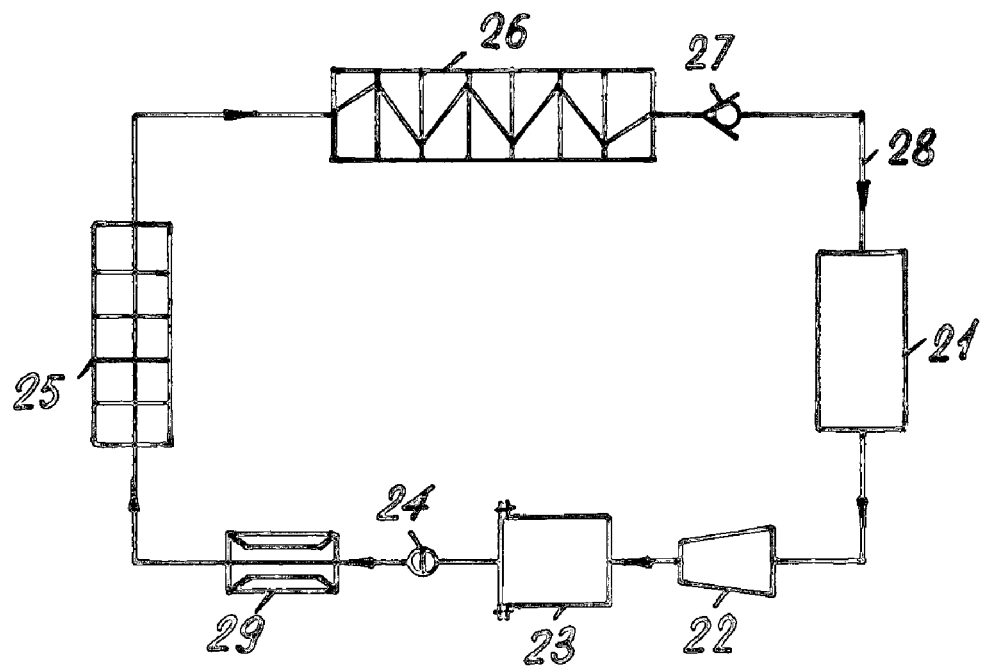
FIG. 2 is a schematic representation of the cooling system corresponding to a basic closed cooling cycle.

FIG. 2 is a schematic view of a cooling system corresponding to a basic closed cooling cycle described by FIG. 1. The cooling system consists of a thermally insulated reservoir 21, containing the liquid refrigerant under initial pressure $p_0$ and temperature $T_0$. A conventional liquid pump 22, pumps the liquid refrigerant into a thermally insulated pressure vessel 23,

TABLE

| Refrigerant | $CO_2$ | R-508A | R-508B | $N_2$ |
|---|---|---|---|---|
| Normal boiling point, ° C. | −78 | −87.7 | −88.3 | −195.79 |
| Critical temperature, ° C. | 31 | 11 | 14 | −147 |
| Critical pressure, MPa | 7.37 | 3.7 | 3.9 | 3.39 | providing the necessary compression of the liquid refrigerant to slightly above the critical pressure $p_c$. A control valve 24, is opened under this pressure which allows the compressed refrigerant to flow through the flow controller, 29, and bring the refrigerant into thermal contact (direct, indirect, or combination thereof) with the hot object to be cooled, 25. The hot object 25 is in thermal contact with a cooling head manufactured with microchannels. The temperature increase and pressure drop of the refrigerant due to hydraulic resistance (impedance) inside the cooling head results from absorption of the waste heat produced by the hot object. The refrigerant is then directed into a heat dissipation device 26, which is a heat exchanger combined with an expansion device 27, that expands the refrigerant, thereby reducing its pressure and temperature, and reverting the refrigerant to its liquid state under initial pressure $p_0$ and temperature $T_0$. The liquid refrigerant is then directed into the reservoir 21, and the closed cooling cycle is continuously repeated. All parts of the cooling system are fluidly connected with thermally insulated transport line 28, to ensure reliable circulation of the refrigerant due to a pressure difference. The flow controller 29, is set to regulate the flow rate of the refrigerant from the pressure vessel 23 to maintain the highest final temperature of the refrigerant that is allowable for the object to be cooled. The cooling system may be designed in various dimensions and configurations for specific engineering applications. Each of the cooling cycle node states is measured with thermocouples and pressure transducers to control the necessary temperature-pressure regimes. The refrigerant flow rate is regulated downstream from the pressure vessel by flow controller 29 which provides better than 2% accuracy in flow rate measurement. Errors in the pressure transducer and thermocouple measurements are less than 0.5% and ±0.3° C. respectively.

Figure 3:
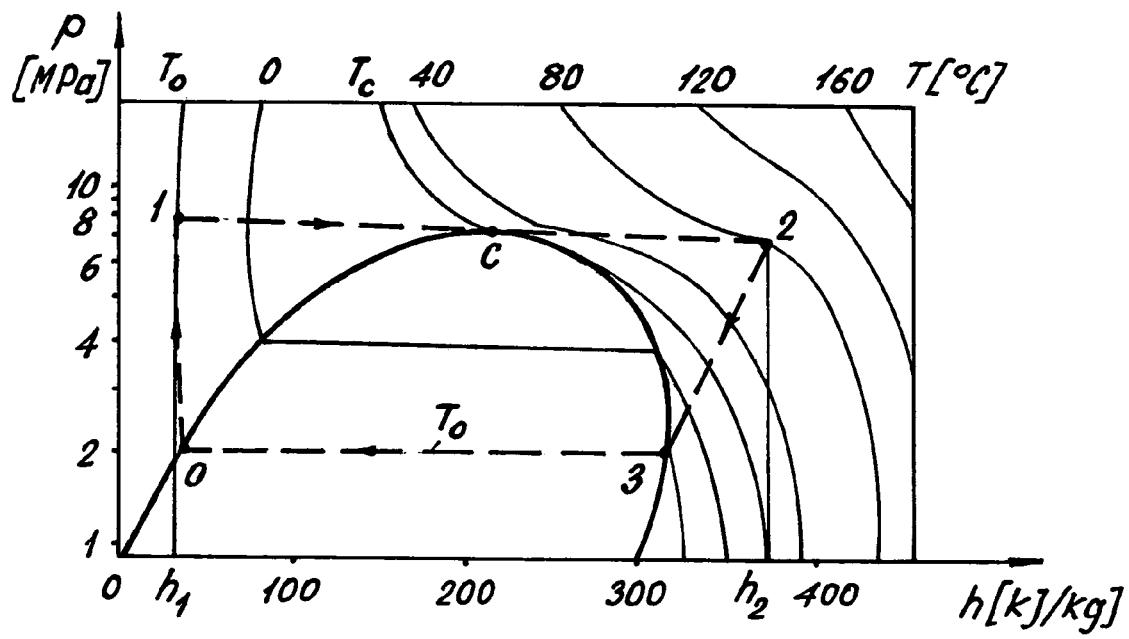
FIG. 3 is the "pressure, p-specific enthalpy, h" diagram of carbon dioxide ($CO_2$).

An example of the proposed basic closed cooling cycle using carbon dioxide ($CO_2$) as a refrigerant is schematically shown in FIG. 3 which is the "pressure, p-specific enthalpy, h" diagram of $CO_2$. The liquid carbon dioxide at point 0 is conventionally under initial pressure $p_0$=2 MPa and initial temperature $T_0$=−20° C., but these initial parameters may be chosen depending on specific cooling requirements. The liquid carbon dioxide is then compressed with a conventional liquid pump slightly above its critical pressure $p_c$=7.37 MPa inside the range 7.6-8.3 MPa from point 0 to point 1 under constant initial temperature $T_0$. The compressed carbon dioxide then enters into thermal contact (direct, indirect, or combination thereof) with the hot object to be cooled absorbing the waste heat with simultaneous increase of the temperature from $T_0$ to a final $T_2$=80° C. During this transition the carbon dioxide crosses the critical point and transfers into the near-critical state as it passes its critical temperature $T_c$=31° C. This process corresponds to the path 1-2 shown in FIG. 3. The enthalpy difference $\Delta h = h_2 - h_1$ corresponds to the amount of the waste heat absorbed by the carbon dioxide. The absorbed waste heat is then rejected into the environment with a simultaneous decrease of refrigerant temperature and pressure below the critical point to reach an initial temperature and pressure that corresponds to the path 2-3-0 shown in FIG. 3.

Figure 4:
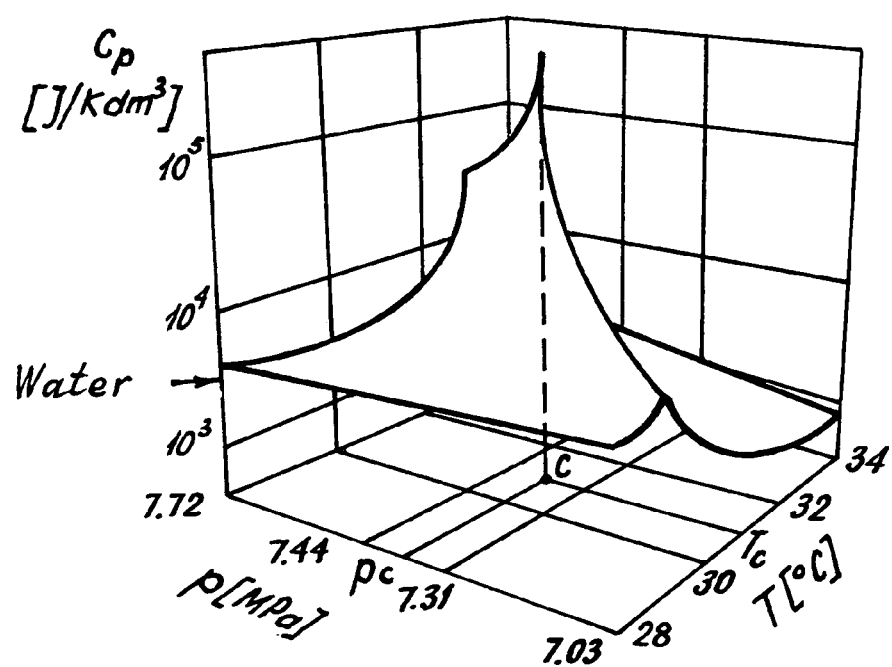
FIG. 4 is a schematic diagram of the heat capacity of carbon dioxide.

Although the critical pressure of carbon dioxide is relatively high, it still may be a good candidate for the proposed cooling cycle since it is a "pure" fluid and, correspondingly, its transport properties and especially heat capacity become much larger at the critical point. Pure substance refrigerants such as carbon dioxide, nitrogen and others cannot stratify under flow providing much more reliable cooling throughout the full parameter range. The graph in FIG. 4 shows the specific heat capacity $C_p$ of carbon dioxide almost approaching infinity at its critical point C which is close to room temperature and under relatively modest pressure. At this point carbon dioxide becomes an extremely efficient refrigerant since its heat capacity is much larger than commonly used conventional refrigerants. As an example, it is much larger than the heat capacity of water (4186 J/K-dm3) shown by the arrow in FIG. 4.

Additionally, carbon dioxide and nitrogen can be successfully used in direct cooling of microelectronic metallization because of its non-corrosive and dielectric properties. Carbon dioxide and nitrogen SCFs could be re-circulated in a continuous flow loop flowing away from the metallization through microchannels and into a large surface area heat exchanger. The cooling loop may also be extended throughout the enclosure of the electronic subsystem to provide overall cooling as needed. This would significantly enhance the heat dissipation capabilities within micro-electronic components such as highly integrated processor chips or power electronic components that operate under extreme environmental temperatures. It is important to emphasize that the pressure required to reach a critical point for carbon dioxide and nitrogen will not present technical difficulties due to their initial liquid state and to the scalability of flow channels.

Figure 5:
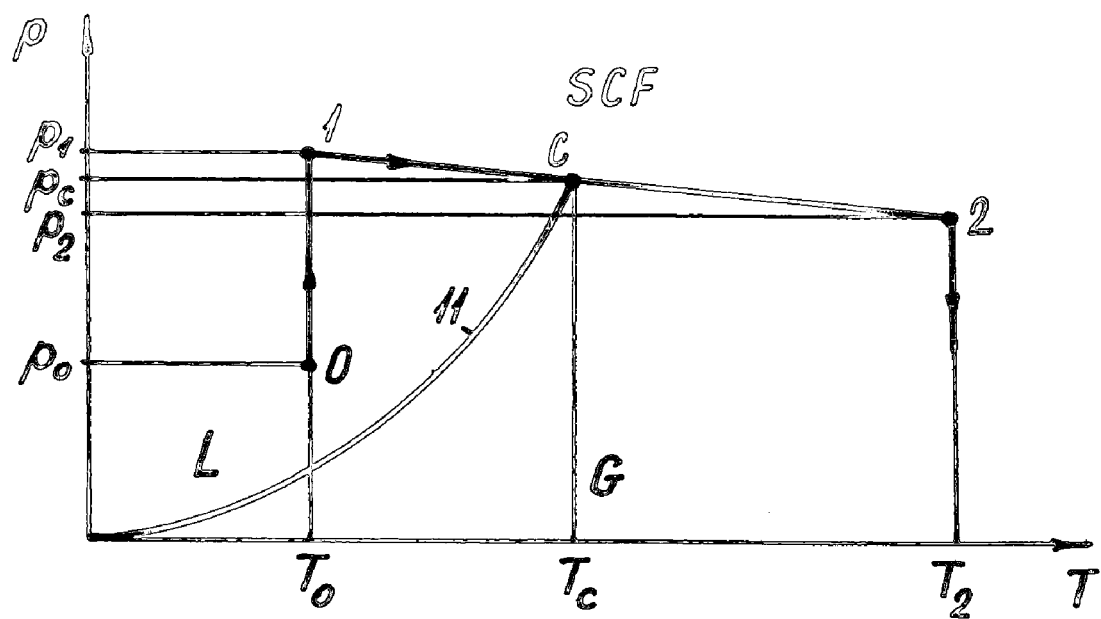
FIG. 5 shows a phase diagram L-G-SCF illustrating the basic open cooling cycle of absorption and dissipation of the waste heat corresponding to present cooling methods.
Figure 6:
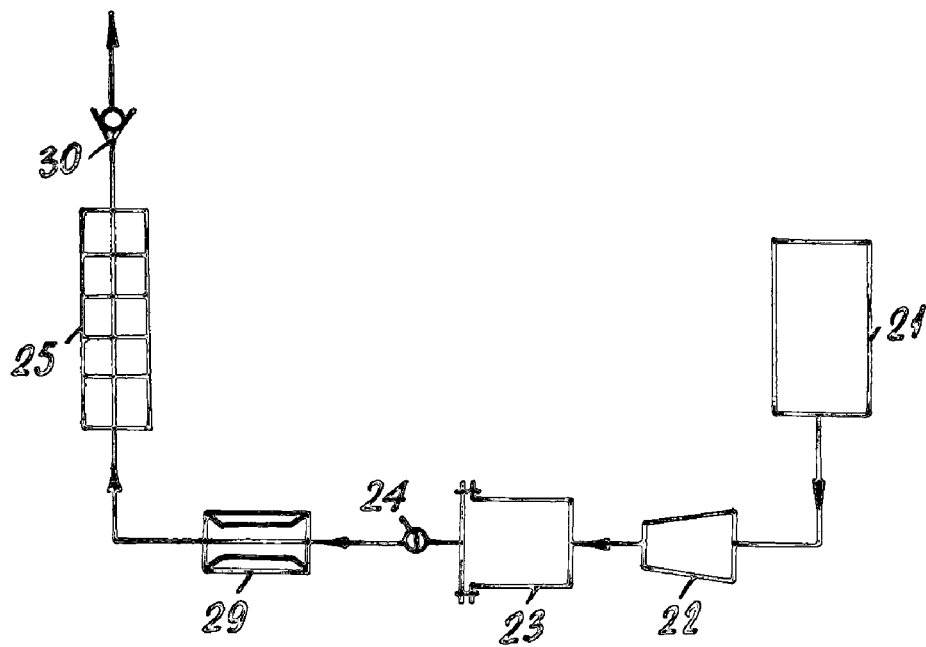
FIG. 6 is a schematic representation of the cooling system corresponding to a basic open cooling cycle.

The basic open cooling cycle corresponding to present cooling methods is shown in FIG. 5 that is the phase diagram L-G-SCF of the refrigerant. FIG. 5 is similar to FIG. 1 but the cooling cycle is open, i. e. refrigerant in point 2 containing absorbed heat will be rejected into the environment. Accordingly, FIG. 6 is similar to FIG. 2, and it is a schematic view of a cooling system corresponding to the basic open cooling cycle described by FIG. 5. The refrigerant flowing from microchannel cooling head 25 is rejected into the environment through check valve 30.

Figure 7:
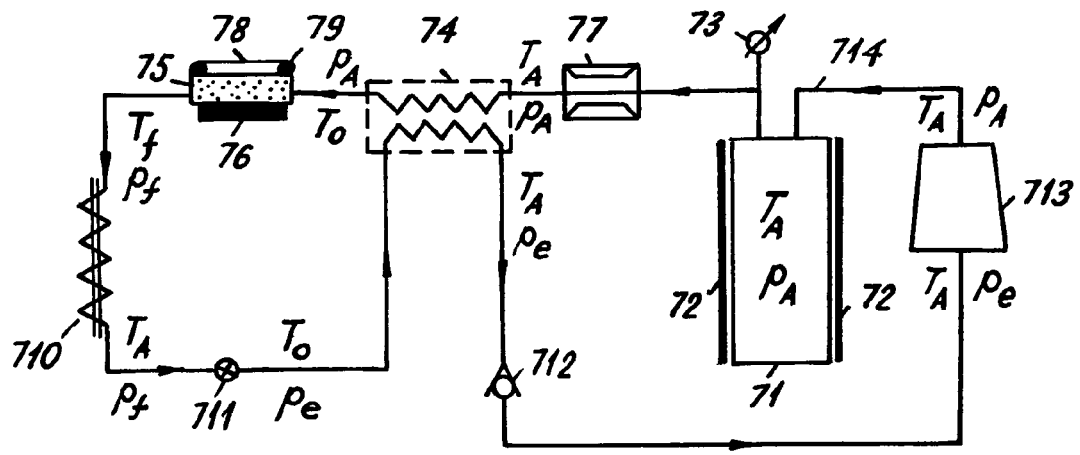
FIG. 7 is a schematic representation of the second embodiment of the present invention corresponding to a closed cooling system.
Figure 8:
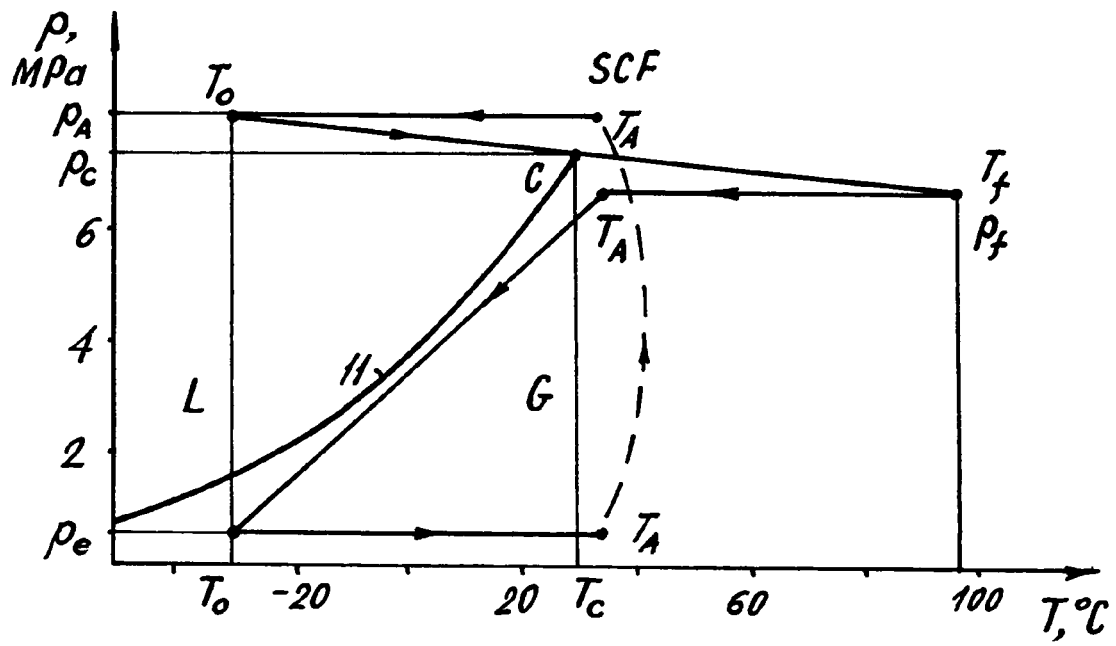
FIG. 8 shows a phase diagram illustrating the closed cooling cycle corresponding to the closed cooling system shown in FIG. 7.

The second embodiment of a new cooling system using carbon dioxide in a SCF state is shown in FIG. 7 and FIG. 8. The latter is a schematic phase diagram of carbon dioxide where L-G-SCF phases coexist. FIG. 7 and FIG. 8 describe an internal cooling mechanism that enables a wide temperature management range from −30° C. to ~100° C. or even wider.

FIG. 7 shows liquid carbon dioxide enclosed in a standard reservoir 71, having a commercial heater 72, that maintains temperature $T_A$ of the reservoir slightly above the critical temperature $T_c$ of carbon dioxide corresponding to the pressure $p_A$ above the critical pressure $p_c$ inside the range of 7.6-8.3 MPa. These temperature-pressure conditions correspond to the SCF state of carbon dioxide shown in FIG. 8. The necessary pressure $p_A$ inside the reservoir is maintained by monitoring an electric pressure gauge 73.

The SCF flowing from the reservoir is cooled first by a counterflow heat exchanger 74, to reach the temperature $T_0$, and a temperature decrease from $T_A$ to $T_0$ occurs under constant pressure $p_A$ above the critical pressure $p_c$, so that no condensation occurs. The SCF then enters into a microchannel cooling head 75, that is in tight thermal contact with an object 76 to be cooled. The heat absorption from the microchannel thermal contact of the refrigerant and the object to be cooled is accompanying by a refrigerant temperature increase from $T_0$ to $T_f$. A simultaneous pressure drop from $p_A$ to $p_f$ caused by the hydraulic resistance (impedance) of the microchannel "sponge" inside the cooling head transfers the refrigerant into the near-critical state. The flow rate of the SCF flowing from the reservoir 71 is adjusted by a flow controller 77 to maintain the final object temperature $T_f$ below 100° C. (or other maximum allowable operational temperature) at all times of operation. A more accurate temperature adjustment and control can be achieved by using an external ceramic heater 78 and thermocouples 79 connected in a loop to an external controller.

The hot carbon dioxide under pressure $p_f$ is then cooled to a temperature close to $T_A$ inside a second heat exchanger 710. Next, internal cooling of carbon dioxide is achieved by abruptly dropping the pressure from $p_f$ to approximately $p_e$ that may be close to 0.6 MPa in a needle valve 711 producing subcooled exhaust gas due to the additional cooling effect. In this process (which is known as the Joule-Thomson effect), the gas temperature drops from $T_A$ to approximately $T_0$. A check valve 712 is adjusted to maintain the low exhaust pressure of subcooled gas to be no less than 0.6 MPa, thus preventing it from turning into the solid phase. This subcooled exhaust gas having inlet temperature $T_0$ at low pressure $p_e$ is then directed into the first counterflow heat exchanger 74, to pre-cool the SCF flowing from reservoir 71 into the microchannel cooling head 75. The outlet temperature of the gas flowing from the first counterflow heat exchanger will be approximately $T_A$, and the external commercial compressor 713 compresses produced exhaust gas from $p_e$ to $p_A$ (i.e. above the critical pressure $p_c$) that transfers the gas into a SCF. The obtained SCF is directed into the reservoir 71 through the transport line 714 allowing for the closed cooling cycle to be continuously repeated.

FIG. 8 shows a phase diagram of carbon dioxide illustrating a closed cooling cycle corresponding to the second embodiment of the invention. There, the phase line 11 defining L-G-SCF carbon dioxide phases ends in critical point C.

Figure 9:
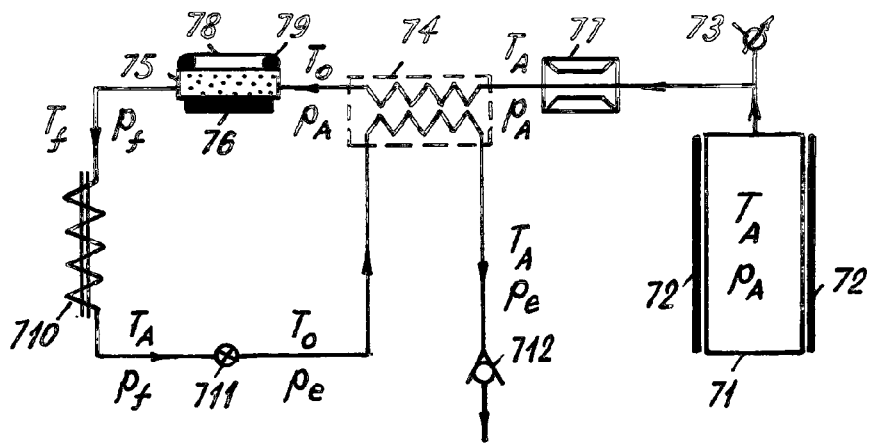
FIG. 9 is a schematic representation of the third embodiment of the present invention corresponding to an open cooling system.
Figure 10:
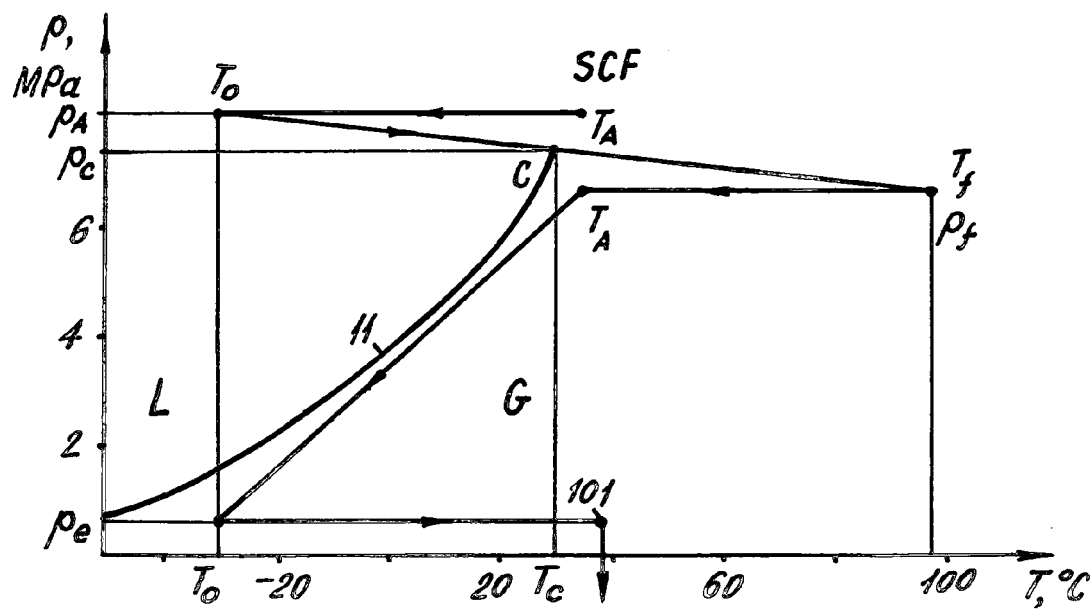
FIG. 10 shows a phase diagram illustrating the open cooling cycle corresponding to the open cooling system shown in FIG. 9.

A third embodiment of the present invention is shown in FIG. 9 and FIG. 10 having the same notations as in FIG. 7 and FIG. 8. This cooling system is based on an open cooling cycle when produced exhaust gas is simply discharged to the atmosphere at point 101 shown in FIG. 10.

CONCLUSION, RAMIFICATIONS, AND SCOPE

Presented cooling methods and systems using supercritical fluids may be effectively employed for numerous engineering applications in which it is necessary to provide effective and reliable cooling of critical objects with high heat emissions. Heat transfer from critical objects depends primarily on the thermodynamic properties of the refrigerants as well as on the flow rate and surface area of the object to be cooled. Microchannel cooling has distinct advantages due to a significant increase in surface area. Conventional two-phase microchannel cooling has some important deficiencies due to complex transient regimes of the liquid refrigerant related to bubble nucleation, "vapor lock", and "boiling crisis" effects that significantly limit the application of this method in future electronic device architectures. On the contrary, the principal advantage of the presented cooling methods consists in the use of the unique thermodynamic properties of supercritical fluids that avoids the main deficiencies of two-phase liquid cooling applications. Microchannel cooling using supercritical fluids can be achieved with no possibility of bubble nucleation, "vapor lock", and "boiling crisis". Complex boiling dynamics never creates intermittency or uncertainty in microchannel cooling systems because of the application of supercritical fluids as a means to absorb a large quantity of heat.

The cooling methods and systems presented will find broad applications in many industries with critical requirements for reliable and effective cooling of jet and internal-combustion engines, spacecraft systems and structures, fuel cells, infrared radiation detectors, nuclear power generation technological equipment, electronic components, and others.

The scope of the invention may depend on the choice of similar types of refrigerants with specific thermodynamic properties such as, for example, relatively high critical pressure, critical temperature, non-flammability, non-corrosion, dielectric property, and others. The scope will unavoidable be broadened by reliable and professional engineering designs of the presented cooling systems.

While the principal idea of the present invention has been described and illustrated, the invention should not be limited to such illustrations and descriptions. It should be apparent that some changes and modifications may be incorporated and embodied as a part of the present invention within the scope of the following claims. In particular, enlargement of the number of refrigerants capable of being used to perform the cooling in the presented cooling methods as well as some modifications made in the design of the presented cooling systems are obvious to one skilled in the art, and do not represent an new independent invention. It is also obvious that the subject invention may be used in concert with some different initial pressures and temperatures of the liquid refrigerants as well as different final operational temperatures of the supercritical fluids depending on allowable operational temperatures of the objects to be cooled. It is also to be understood that other embodiments may be utilized and structural and logical changes may be made without departing from the claims of the present invention.

The invention claimed is:

1. A cooling method using supercritical fluids and microchannel cooling technology comprising:
   a. a closed cooling cycle beginning from compression of liquid refrigerant at an initial temperature and pressure below the critical point to reach the pressure above the critical pressure at said initial temperature below the critical temperature;
   b. transferring compressed refrigerant into microchannel thermal contact (direct, indirect, or combination thereof) with objects to be cooled in order to absorb the heat produced by said objects to be cooled corresponding to a refrigerant temperature increase and a pressure drop due to the hydraulic resistance inside the microchannels that transfers the refrigerant into a near-critical state;
   c. cooling said refrigerant in said near-critical state in order to reject the absorbed heat with a simultaneous temperature and pressure decrease of the refrigerant to reach said initial temperature and pressure below said critical point corresponding to the transition of refrigerant into the liquid phase;
   d. compression of liquid refrigerant at said initial temperature and pressure below said critical point to reach the pressure above said critical pressure at said initial temperature in order to continuously repeat said closed cooling cycle.

2. A cooling method using nearcritical fluids and microchannel cooling technology comprising:
   a. an open cooling cycle beginning from compression of the liquid refrigerant at initial temperature and pressure below the critical point to reach the pressure above the critical pressure at said initial temperature below the critical temperature;
   b. transferring compressed refrigerant into microchannel thermal contact (direct, indirect, or combination thereof) with objects to be cooled in order to absorb the heat produced by said objects to be cooled corresponding to a refrigerant temperature increase and pressure drop due to hydraulic resistance inside the microchannels that transfers said refrigerant into the near-critical state;
   c. rejection of said refrigerant in said near-critical state into the environment.

3. A cooling method using supercritical fluids and microchannel cooling technology comprising:
   a. a closed cooling cycle beginning from heating the refrigerant above the critical temperature while simultaneously increasing the pressure above the critical pressure that transfers the refrigerant into a supercritical fluid;
   b. cooling said supercritical fluid in a counterflow heat exchanger to reach an initial temperature below said critical temperature at a pressure above said critical pressure;
   c. transferring refrigerant at said initial temperature below said critical temperature and pressure above said critical pressure into microchannel thermal contact (direct, indirect, or combination thereof) with objects to be cooled in order to absorb heat produced by said objects to be cooled corresponding to refrigerant temperature increase and pressure drop due to hydraulic resistance inside the microchannels that transfers said refrigerant into near-critical state;
   d. rejection of absorbed heat with simultaneous refrigerant temperature decrease due to refrigerant cooling followed by throttling to produce subcooled gas at low pressure and temperature higher than pressure and temperature of refrigerant at its triple point of temperature and pressure;
   e. absorption of heat from said supercritical fluid by means of said counterflow heat exchanger receiving said supercritical fluid and said subcooled exhaust gas followed by increase of temperature of said subcooled exhaust gas to a temperature close to the critical temperature at said low pressure;
   f. compression of said exhaust gas at said temperature close to said critical temperature at low pressure to reach the pressure above said critical pressure corresponding to the transition of said exhaust gas into supercritical fluid;
   g. cooling said supercritical fluid in a counterflow heat exchanger in order to repeat said closed cooling cycle.

4. A cooling method using supercritical fluids and microchannel cooling technology comprising:
   a. an open cooling cycle beginning from heating the refrigerant above the critical temperature while simultaneously increasing the pressure above the critical pressure that transfers the refrigerant into a supercritical fluid;

b. cooling said supercritical fluid in a counterflow heat exchanger to reach an initial temperature below said critical temperature at a pressure above said critical pressure;

c. transferring refrigerant at said initial temperature below said critical temperature and pressure above said critical pressure into microchannel thermal contact (direct, indirect, or combination thereof) with objects to be cooled in order to absorb heat produced by said objects to be cooled corresponding to a refrigerant temperature increase and pressure drop due to hydraulic resistance inside the microchannels that transfers said refrigerant into a near-critical state;

d. rejection of absorbed heat with simultaneous refrigerant temperature decrease due to refrigerant cooling followed by throttling to produce subcooled gas at low pressure and a temperature higher than the pressure and temperature of refrigerant at its triple point of temperature and pressure;

e. absorption of heat from said supercritical fluid by means of said counterflow heat exchanger receiving said supercritical fluid and said subcooled exhaust gas followed by an increase of temperature of said subcooled exhaust gas to a temperature close to critical temperature at said low pressure;

f. rejection of exhaust gas into the environment.

* * * * *